(12) United States Patent
Murazumi et al.

(10) Patent No.: US 11,027,674 B2
(45) Date of Patent: Jun. 8, 2021

(54) CONSTRUCTION MACHINE

(71) Applicant: Hitachi Construction Machinery Co., Ltd., Tokyo (JP)

(72) Inventors: Tomoya Murazumi, Ushiku (JP); Takenori Hiroki, Ami-machi (JP); Hisashi Tago, Kashiwa (JP); Hironori Itou, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/643,613

(22) PCT Filed: Nov. 27, 2018

(86) PCT No.: PCT/JP2018/043580
§ 371 (c)(1),
(2) Date: Mar. 2, 2020

(87) PCT Pub. No.: WO2019/116884
PCT Pub. Date: Jun. 20, 2019

(65) Prior Publication Data
US 2020/0207288 A1 Jul. 2, 2020

(30) Foreign Application Priority Data
Dec. 15, 2017 (JP) .............................. JP2017-240574

(51) Int. Cl.
*B60R 16/02* (2006.01)
*H02P 3/12* (2006.01)
*E02F 9/00* (2006.01)

(52) U.S. Cl.
CPC ................ *B60R 16/02* (2013.01); *H02P 3/12* (2013.01); *E02F 9/003* (2013.01)

(58) Field of Classification Search
CPC ........................................................ B60R 16/02
(Continued)

(56) References Cited

U.S. PATENT DOCUMENTS 6,628,790 B1 9/2003 Klein
2012/0175953 A1* 7/2012 Ohkawa .................. B60L 58/14
307/18

(Continued)

FOREIGN PATENT DOCUMENTS

JP 2000-41342 A 2/2000
JP 2001-76494 A 3/2001
(Continued)

OTHER PUBLICATIONS

International Search Report (PCT/ISA/210) issued in PCT Application No. PCT/JP2018/043580 dated Jan. 15, 2019 with English translation (four (4) pages).
(Continued)

*Primary Examiner* — Joseph Chang
(74) *Attorney, Agent, or Firm* — Crowell & Moring LLP (57) ABSTRACT

A plus-side main connection line (17) connects electrical equipment (11), (12) to a plus terminal (16A) of a battery (16). A plus-side isolating switch (18) is provided in the plus-side main connection line (17) to connect or disconnect the electrical equipment (11), (12) and or from the plus terminal (16A) of the battery (16). A plus-side auxiliary connection line (20) connects a communication terminal (15) to the plus terminal (16A) of the battery (16) in a position upstream of the plus-side isolating switch (18). A minus-side main connection line (22) connects a minus terminal (16B) of the battery (16) to ground. A minus-side isolating switch (23) is provided in the minus-side main connection line (22) to connect or disconnect the minus terminal (16B) of the battery (16) and or from the ground.

5 Claims, 3 Drawing Sheets

(58) Field of Classification Search
USPC .......................................................... 307/9.1
See application file for complete search history.

(56) References Cited

U.S. PATENT DOCUMENTS

| | | | |
|---|---|---|---|
| 2015/0210169 A1* | 7/2015 | Tarkiainen | B60L 50/16 290/45 |
| 2015/0298628 A1* | 10/2015 | Amano | B60Q 1/0088 307/9.1 |
| 2016/0164285 A1* | 6/2016 | Elliott | H02J 1/10 307/9.1 |
| 2020/0039339 A1* | 2/2020 | Naya | E02F 9/20 |

FOREIGN PATENT DOCUMENTS

| | | | |
|---|---|---|---|
| JP | 2003-37550 A | 2/2003 |
| JP | 2003-508810 A | 3/2003 |
| JP | 2012-17561 A | 1/2012 |

OTHER PUBLICATIONS

Japanese-language Written Opinion (PCT/ISA/237) issued in PCT Application No. PCT/JP2018/043580 dated Jan. 15, 2019 (four (4) pages).

* cited by examiner

CONSTRUCTION MACHINE

TECHNICAL FIELD

The present invention relates to a construction machine equipped with a battery.

BACKGROUND ART

In order to comply with regulations (EN474-1) and general requirements (ISO20474-1) required for construction machines equipped with batteries, it is required that a power storage device such as a battery can be easily cut off by a quick coupling or an accessible isolator switch. To cope with this, a construction machine is mainly equipped with a battery isolating device that can easily cut off the negative circuit of the battery.

The battery isolating device for a construction machine includes a main switch that selectively connects or disconnects a plurality of devices to or from a battery, a normally closed type circuit breaking switch that entirely cuts off power supply to all devices from the battery, and a control device with a timer that detects a state in which the main switch has not been used during a pre-set time and controls the circuit breaking switch to an isolated state (for example, refer to Patent Document 1).

PRIOR ART DOCUMENT

Patent Document

Patent Document 1: Japanese Patent Laid-Open No. 2000-41342 A

SUMMARY OF THE INVENTION

One of the intended uses of the battery isolating device is to suppress the discharge of the battery during a long-term suspension of the construction machine. The reason for this is that there occurs a problem of a battery voltage being gradually decreases during the long-term suspension, as in the case of general transportation machine equipped with a battery. Likely, causes for the battery voltage drop include a spontaneous discharge of the battery, a backup current for retaining the memory of the electrical equipment, or the like, for example. Therefore, a battery isolating device is provided in the midst of the electrical connection between the battery and various electrical equipment, and by cutting off power supply by the battery isolating device during long-term machine suspension, battery discharge and the like can be suppressed.

In addition, the battery isolating device plays two roles of protecting a service staff from electric shock during maintenance work on the construction machine (electrical repair work or welding work when modifying the main body, etc.) by the service staff, and preventing damage to the electrical equipment due to the wraparound current from a welding machine. Further, by cutting off power at the end of a day's work by the operator, the battery isolating device has a function of daily battery discharge suppression or theft prevention.

Incidentally, the construction machine provides services such as prediction of the replacement timing of consumable parts, delivery of an alarm mail for prompt troubleshooting when a failure occurs, or submission of reports (daily report or monthly report) regarding vehicle body operation data during a predetermined period to the user, for example.

Thus, the construction machine records machine operation information, position information, and information at the time of failure occurrence as its vehicle body information, and is equipped with a communication terminal having a function of transmitting such data to a server, periodically (for example, once a day at a fixed time) or when necessary. At the same time, the construction machine has a function capable of arbitrarily downloading the vehicle body data stored to the communication terminal from the server side.

This communication terminal, like other electrical equipment, operates by power supplied from the battery. Therefore, when cutting off power supply by the battery isolating device, the power supply to the communication terminal is also cut off, thereby, it becomes impossible to periodically transmit data to or download the vehicle body information from the server at an arbitrary timing.

When data is unable to be sent from the communication terminal, since the data cannot be collected properly at the server side, the vehicle body data during that period becomes unknown. On the other hand, the cause in which the server is unable to collect data is not limited to one, and multiple causes can be considered. For example, due to the vehicle body being in a halted state (the user cut off power supply by the battery isolating device at the completion of work), due to poor radio wave condition of the vehicle body resulting in communication being disabled, or due to failure of devices such as the communication terminal. Whereas, due to the isolation by the battery isolating device, when data is unable to be transmitted from the communication terminal, the cause for the server's incapability to collect data cannot be determined at all from outside. As a result, operation status and failure status report provided to the user becomes uncertain.

Here, when the circuit breaking switch with a timer described in Patent Document 1 is applied to a construction machine having a communication terminal, power is supplied to the communication terminal within a set time. However, after the set time, power supply from the battery is cut off, and the communication terminal stops. Therefore, such a configuration does not substantially solve the problem of being unable to transmit data from the communication terminal when necessary.

Even when cutting off power supply by the battery isolating device, as long as power is continuously supplied to the communication terminal without being affected by the set time of the timer or the like, the vehicle body data can be transmitted to the server. In this case, it becomes possible for the server side to collect the above-described halted state, and can be utilized as information related to the above-described various services submitted to the user.

For example, if a communication terminal having a dedicated battery is installed in the construction machine, power can be supplied to the communication terminal without being affected by the operation of the battery isolating device. In this case, it can be a solution for determining the halted state of the vehicle body. However, since replacement and maintenance due to the life of the dedicated battery as well as other maintenance is required, this is not considered as an easy solving means.

At the end of work by the operator, the battery isolating device is used for the purpose of daily theft prevention or battery discharge suppression. Therefore, at that time, if the power solely for the communication terminal is utilized, services that the construction machine provides to the user, such as distribution of daily operation data, alarm mail, or operation information reports can be performed.

On the other hand, in the case of maintenance work by the service staff or long term suspension of a construction machine, all power including power to the communication terminal needs to be cut off to prevent damage to equipment due to electric shock, welding, etc. and to suppress long-term discharge of the battery.

The present invention is made in view of the aforementioned problem of the prior art, and an object of the present invention is to provide a construction machine capable of choosing between cutting off the power of the electrical equipment excluding the communication terminal or cutting off the power of the electrical equipment including the communication terminal.

In order to solve the aforementioned problem, a construction machine according to the present invention includes: an electrical equipment installed in a vehicle body; a communication terminal for transmitting information of the vehicle body to a server; and a battery for supplying power to the electrical equipment and the communication terminal, characterized in that the construction machine further includes: a plus-side main connection line for connecting the electrical equipment and a plus terminal of the battery; a plus-side isolating switch provided on the plus-side main connection line for connecting or disconnecting the electrical equipment to or from the plus terminal of the battery; a key switch positioned at a downstream side of the plus-side isolating switch and is connected in series to the plus-side isolating switch for connecting or disconnecting the electrical equipment to or from the plus terminal of the battery; a plus-side auxiliary connection line positioned at an upstream side of the plus-side isolating switch for connecting the communication terminal and the plus terminal of the battery; a minus-side main connection line for connecting a minus terminal of the battery and ground; and a minus-side isolating switch provided on the minus-side main connection line for connecting or disconnecting the minus terminal of the battery to or from the ground.

According to the present invention, in accordance with the intended use of the operator or the service staff, the plus-side isolating switch and the minus-side isolating switch can be individually set to an isolated state or a connected state. Therefore, by setting the minus-side isolating switch in the connected state and the plus-side isolating switch in the isolated state, the transmission function of the communication terminal can be maintained while preventing theft and suppression of battery discharge.

Further, by disconnecting the minus-side isolating switch, it is possible to prevent discharge of the battery during a long-term suspension of the vehicle body and to ensure safety during maintenance work by the service staff (electric shock, or damage to the equipment during welding, etc.).

MODE FOR CARRYING OUT THE INVENTION

Hereinafter, a hydraulic excavator will be described in detail as an example of a construction machine according to the embodiment of the present invention by referring to the attached drawings.

Figure 1:
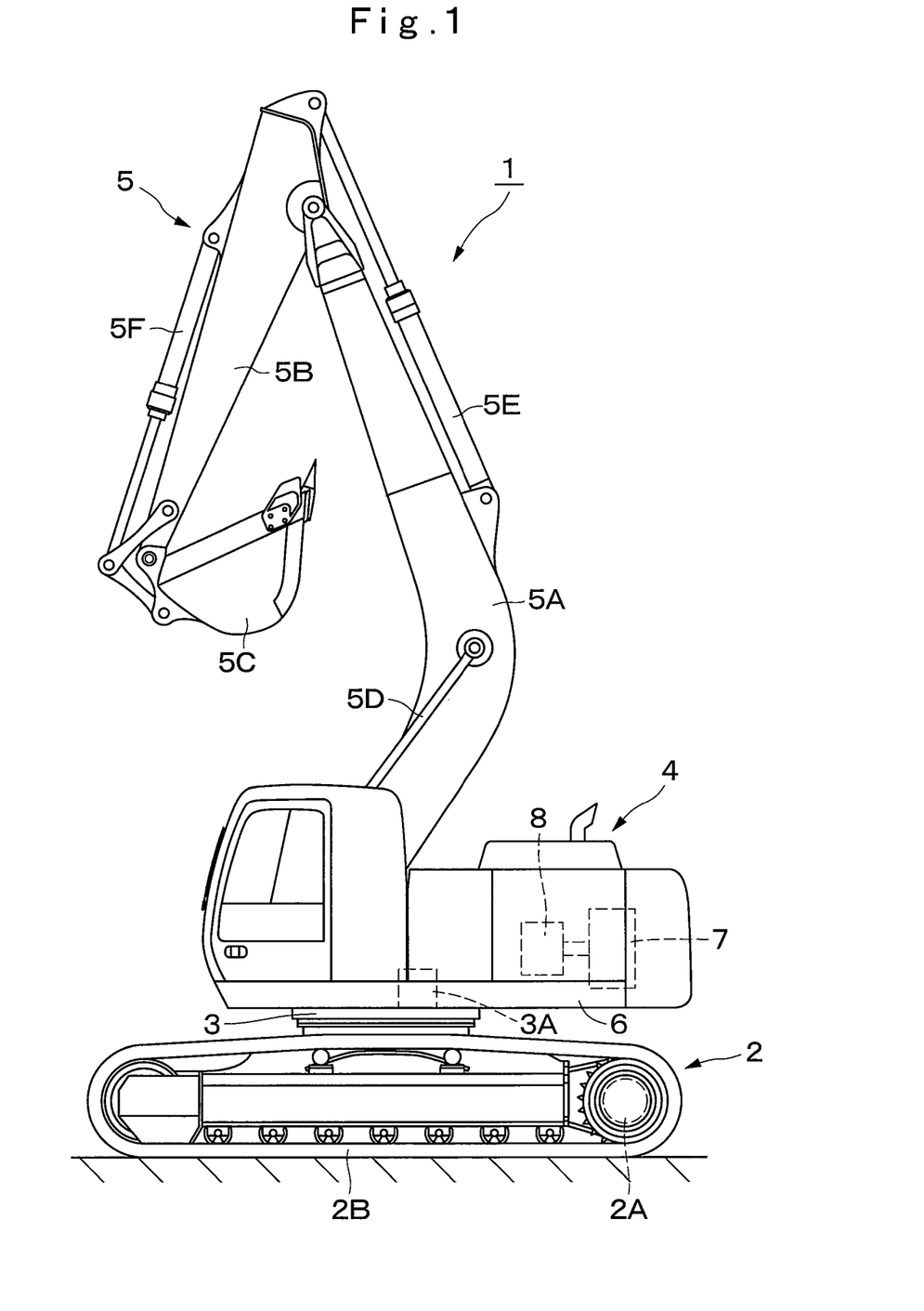
FIG. 1 is a front view showing a hydraulic excavator according to the embodiment of the present invention.

As illustrated in FIG. 1, the hydraulic excavator 1 includes an automotive crawler-type lower traveling structure 2, an upper revolving structure 4 rotatably mounted on the lower traveling structure 2 serving as a moving means via a revolving device 3, and a working mechanism 5 of an articulated structure provided on the front side of the upper revolving structure 4 and performing excavating operation and the like. The lower traveling structure 2 and the upper revolving structure 4 constitute the vehicle body of the hydraulic excavator 1. The lower traveling structure 2 includes a hydraulic motor 2A for performing traveling operation. The revolving device 3 includes a hydraulic motor 3A for performing revolving operation. The lower traveling structure 2 is a crawler type illustrated herein, but may be a wheel type.

The working mechanism 5 corresponds to a front actuator mechanism. The working mechanism 5 is configured by a boom 5A, an arm 5B, a bucket 5C, and a boom cylinder 5D, an arm cylinder 5E, and a bucket cylinder 5F driving the boom 5A, the arm 5B, and the bucket 5C, respectively. The working mechanism 5 is mounted on a revolving frame 6 of the upper revolving structure 4.

In the upper revolving structure 4, an engine 7 as a prime mover and a hydraulic pump 8 (a main pump) driven by the engine 7 are mounted. By hydraulic oil delivered from the hydraulic pump 8, the lower traveling structure 2, the upper revolving structure 4, and the working mechanism 5 operate independently of one another.

Specifically, the lower traveling structure 2 drives a pair of crawlers 2B (only one side is shown in FIG. 1) for traveling by allowing the hydraulic pump 8 to deliver hydraulic oil to the traveling hydraulic motor 2A. The upper revolving structure 4 is rotationally driven by allowing the hydraulic pump 8 to deliver hydraulic oil to a revolving hydraulic motor 3A. The cylinders 5D to 5F extend or contract by hydraulic oil delivered from the hydraulic pump 8. As a result, the working mechanism 5 performs lifting operation, excavation, ground leveling, and the like.

Subsequently, a configuration related to a power cutoff circuit of the hydraulic excavator 1 according to the present embodiment will be described by referring to FIGS. 2 and 3.

Figure 2:
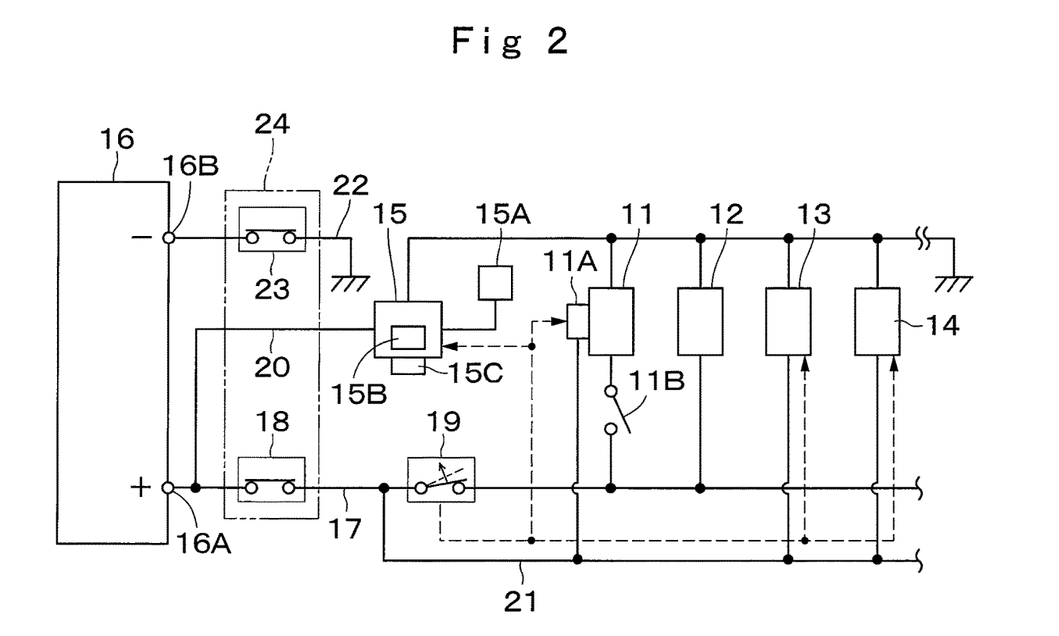
FIG. 2 is an electric circuit diagram showing a configuration of the power cutoff circuit according to the embodiment of the present invention.
Figure 3:
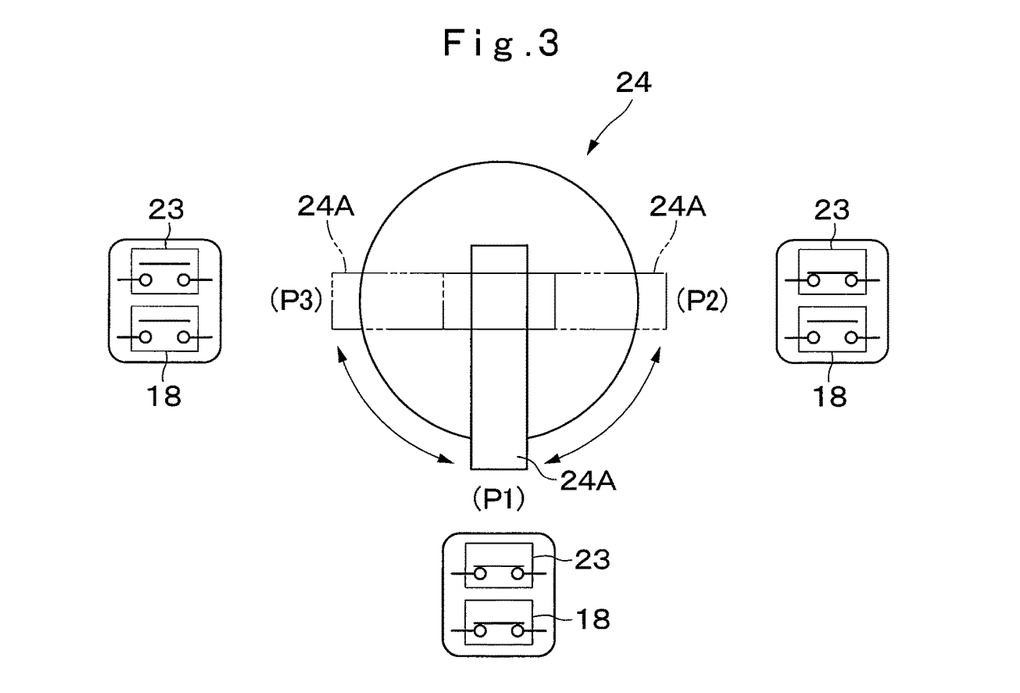
FIG. 3 is an explanatory diagram showing the composite switch in FIG. 2.

As shown in FIG. 2, the hydraulic excavator 1 is configured to provide first and second electrical equipment 11, 12 installed in the vehicle body, a communication terminal 15 for transmitting information related to the vehicle body to a server (not shown), and a battery 16 for supplying power to the electrical equipment 11, 12 and the communication terminal 15. The hydraulic excavator 1 further provides first and second control devices 13, 14 installed in the vehicle body. The first and the second control devices 13, 14 are also supplied with power from the battery 16. The electrical equipment 11, 12 and the control devices 13, 14 have functions that are different from that of the communication terminal 15. That is, the electrical equipment 11, 12 is provided with functions other than wireless communication, for example, control of lighting, sound, or air conditioning, etc. that are functions incidental to the vehicle body, or a function to start the engine 7. The control devices 13, 14 correspond to those having functions other than wireless communication, for example, drive control of the vehicle body (control of the engine 7 or the entire vehicle body). The electrical equipment 11, 12, the control devices 13, 14, the communication terminal 15, and the battery 16 are installed in the upper revolving structure 4 as the vehicle body of the hydraulic excavator 1. The electrical equipment 11, 12, the control devices 13, 14 and the communication terminal 15 are connected to the vehicle body which serves as the ground.

The first electrical equipment 11 corresponds to, for example, an audio equipment. The electrical equipment 11 has a memory 11A for storing various setting information such as volume, radio channel selection, preset information, and the like. The first electrical equipment 11 is not limited to the audio equipment, and may be an air conditioner, for example. In this case, various setting information of the air conditioner such as the temperature, the wind direction, the air volume, and the like are stored in the memory 11A. The electrical equipment 11 is additionally provided with a switch 11B for independently switching between driving and stopping. The switch 11B is positioned at a downstream side of a key switch 19 (a side farther from the battery 16), and is provided in a line that individually supplies power to the electrical equipment 11.

The second electrical equipment 12 corresponds to, for example, an engine starting device. The second electrical equipment 12 performs control to start the engine 7 when the key switch 19 is switched to a start position (not shown).

The first control device 13 corresponds to, for example, an engine controller. The first control device 13 is connected to various sensors (not shown) for detecting, for example, the engine speed, etc. The first control device 13 controls the operation of the engine 7 based on detection signals, etc. from the sensors.

The second control device 14 corresponds to, for example, a vehicle controller. The second control device 14 is connected to the first control device 13 (the engine controller) via a network (CAN: Controller Area Network) of a multiplex communication system for vehicles. The second control device 14 is connected to various sensors (not shown) for detecting, the running speed of the vehicle, the discharge pressure, etc. of the hydraulic pump 8, for example. The second control device 14 controls the entire vehicle body system based on information input from the first control device 13 (for example, engine speed, etc.), detection signals from the sensors, and the like.

The communication terminal 15 includes a GPS antenna 15A that acquires position information from a satellite, and a communication antenna 15B that communicates with the server (neither is shown) via a terrestrial base station or the satellite, for example. The communication terminal 15 has a memory 15C for storing vehicle body information such as daily operation report or position information of the hydraulic excavator 1, for example. Here, note that the GPS antenna 15A is not limited to obtaining position information, and may obtain time information from the satellite as well.

The battery 16 is configured by various types of secondary batteries such as a lead storage battery. The battery 16 is electrically connected to the electrical equipment 11, 12 and the communication terminal 15. In addition, the battery 16 is electrically connected to the control devices 13, 14. The battery 16 supplies electric power for driving the electrical equipment 11, 12, the control devices 13, 14, and the communication terminal 15. The battery 16 has a plus terminal 16A connected to the electrical equipment 11, 12, the control devices 13, 14 and the communication terminal 15, and a minus terminal 16B connected to the ground. A plus-side main connection line 17 connects the electrical equipment 11, 12 and the control devices 13, 14 to the plus terminal 16A of the battery 16.

A plus-side isolating switch 18 is provided in the plus-side main connection line 17. The plus-side isolating switch 18 connects or disconnects the electrical equipment 11, 12 and the control devices 13, 14 to or from the plus terminal 16A of the battery 16. As a result, the plus-side isolating switch 18 allows or cuts off power supply to the electrical equipment 11, 12 and the control devices 13, 14, including the memory 11A. Further, the plus-side isolating switch 18 is provided in a composite switch 24 together with a minus-side isolating switch 23. When the operator manually operates the composite switch 24, the plus-side isolating switch 18 is switched between a connected state and an isolated state.

The key switch 19 is positioned at a downstream side of the plus-side isolating switch 18 and is connected in series to the plus-side isolating switch 18. Specifically, the key switch 19 is positioned at the downstream side of the plus-side isolating switch 18 and is provided in the plus-side main connection line 17. The key switch 19 connects or disconnects the electrical equipment 11, 12 to or from the plus terminal 16A of the battery 16. As a result, the key switch 19 allows or cuts off the power supply to the electrical equipment 11, 12. Further, the key switch 19 also has a function of instructing startup and stop of the memory 11A of the first electrical equipment 11 and the control devices 13, 14.

By turning on and off the key switch 19, a key-on signal is output to the memory 11A of the electrical equipment 11, the control devices 13, 14, and the communication terminal 15. The key switch 19 is a switch (for example, an ignition key switch) for instructing startup and stop of the engine 7. By operating the key switch 19 to the position for engine start (not shown), the second electrical equipment 12 composed of an engine starting device starts the engine 7.

A plus-side auxiliary connection line 20 connects the communication terminal 15 to the plus terminal 16A of the battery 16 at a position upstream of (closer side to the battery 16) the plus-side isolating switch 18. FIG. 2 illustrates a case where the plus-side auxiliary connection line 20 branches off from the plus-side main connection line 17 at a position upstream of the plus-side isolating switch 18. Alternatively, the plus-side auxiliary connection line 20 may be directly connected to the plus terminal 16A of the battery 16.

The plus-side auxiliary connection line 20 directly connects the communication terminal 15 to the plus terminal 16A of the battery 16. Therefore, the communication terminal 15 is supplied with power from the battery 16 without being affected at all by the operation of the plus-side isolating switch 18 and the key switch 19.

A plus-side branch line 21 branches from the plus-side main connection line 17 between the plus-side isolating switch 18 and the key switch 19. The plus-side branch line 21 is connected to the memory 11A of the electrical equipment 11 and the control devices 13, 14. Therefore, when the plus-side isolating switch 18 is in the connected state, the memory 11A of the electrical equipment 11 and the control devices 13, 14 are supplied with power from the battery 16 without being affected at all by the operation of the key switch 19.

That is, the memory 11A of the electrical equipment 11 and the control devices 13, 14 are connected to the battery 16 via the plus-side isolating switch 18 without passing through the key switch 19. Therefore, the power supply from the battery 16 to the memory 11A of the electrical equipment 11 and the control devices 13, 14 is not cut off even when the key switch 19 is turned off (an isolated state). Thus, when the key switch 19 is turned off by the OFF operation, the memory 11A of the electrical equipment 11 and the control devices 13, 14 can back up various data including setting information (volume, channel selection, etc.), time information, and control information, for example.

A minus-side main connection line 22 connects the minus terminal 16B of the battery 16 to the ground. Here, the ground corresponds to the vehicle body of the hydraulic excavator 1. Therefore, the minus-side main connection line 22 is connected to the revolving frame 6 of the upper revolving structure 4, for example.

The minus-side isolating switch 23 is provided in the minus-side main connection line 22. The minus-side isolating switch 23 connects or disconnects the minus terminal 16B of the battery 16 to or from the ground. As a result, the minus-side isolating switch 23 allows or cuts off power supply to the electrical equipment 11, 12, the control devices 13, 14, and the communication terminal 15. Further, the minus-side isolating switch 23 is provided in the composite switch 24 together with the plus-side isolating switch 18. When the operator manually operates the composite switch 24, the minus-side isolating switch 23 switches between the connected state and the isolated state.

The composite switch 24 is provided with the plus-side isolating switch 18 and the minus-side isolating switch 23. As shown in FIG. 3, the composite switch 24 includes: a first switching position P1 (a connected position) where both the minus-side isolating switch 23 and the plus-side isolating switch 18 are in the connected state; a second switching position P2 (one side in a cut-off position) where the minus-side isolating switch 23 is in the connected state and the plus-side isolating switch 18 is in the isolated state; and a third switching position P3 (both sides in the cut-off positions) where both the minus-side isolating switch 23 and the plus-side isolating switch 18 are in the isolated state.

Here, the composite switch 24 is provided with a rotary lever 24A for selectively switching the three switching positions P1 to P3. When the lever 24A is placed at a neutral position, the composite switch 24 is set to the first switching position P1. When the lever 24A is rotated from the neutral position in one direction (the right direction in FIG. 3), the composite switch 24 is set to the second switching position P2. When the lever 24A is rotated from the neutral position in the other direction (the left direction in FIG. 3), the composite switch 24 is set to the third switching position P3. That is, with regard to the second switching position P2 and the third switching position P3, the rotating direction when operating the lever 24A becomes opposite, with the first switching position P1 interposed therebetween.

Next, the operation of the power cut-off circuit according to the present embodiment will be described with reference to FIGS. 2 to 5.

During the operating state of the engine 7, the composite switch 24 is set to the first switching position P1. At this time, as shown in FIG. 2, the plus-side isolating switch 18, the minus-side isolating switch 23, and the key switch 19 are all in the connected state. Therefore, the electrical equipment 11, 12, the control devices 13, 14, and the communication terminal 15 are supplied with power from the battery 16.

When the key switch 19 is turned off, the engine 7 stops. At this time, the first electrical equipment 11 and the second electrical equipment 12 which is the engine starting device, are cut off from the battery 16 and power supply from the battery 16 is cutoff. On the other hand, the memory 11A of the electrical equipment 11, the first control device 13 (the engine controller), the second control device 14 (the vehicle body controller), and the communication terminal 15 maintain power supply from the battery 16.

Figure 4:
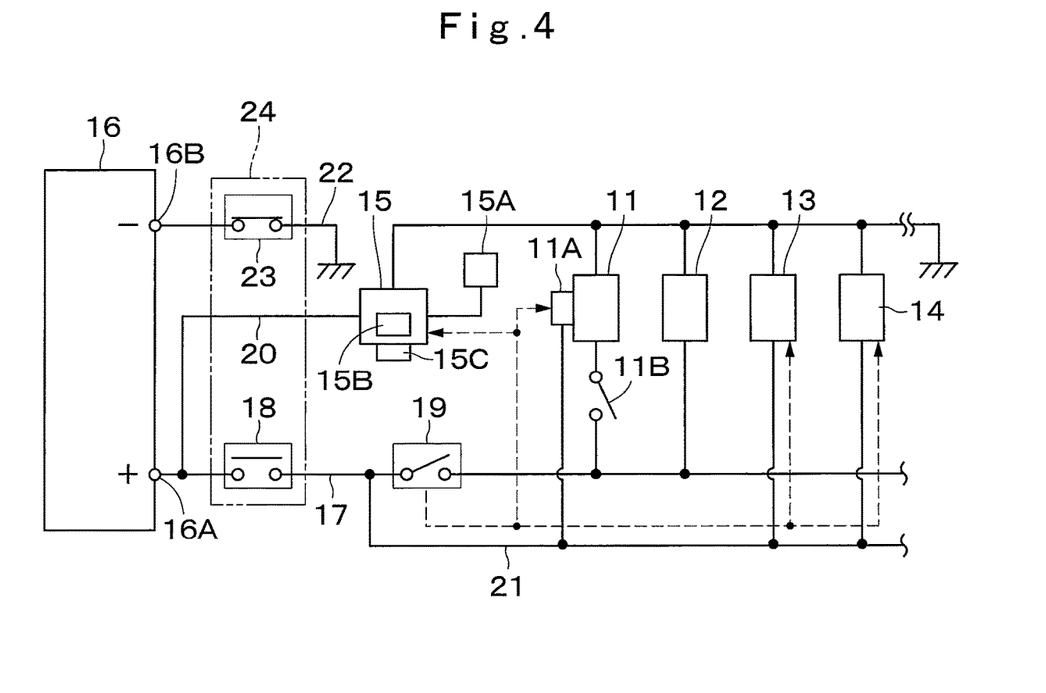
FIG. 4 is an electric circuit diagram similar to FIG. 2 showing a case where the minus-side isolating switch is in a connected state and the plus-side isolating switch is in an isolated state.

When the operator finishes work and the vehicle body is in a halted state, the operator switches the composite switch 24 to the second switching position P2. Thereby, as shown in FIG. 4, the plus-side isolating switch 18 is disconnected while the minus-side isolating switch 23 is in the connected state. When the plus-side isolating switch 18 is disconnected, the power supply from the battery 16 to the memory 11A of the electrical equipment 11 and the control devices 13, 14 is cut off. Accordingly, since dark current of the vehicle body is reduced, discharge of the battery 16 can be suppressed to the utmost extent, and so-called battery exhaustion can be prevented. On the other hand, the communication terminal 15 maintains power supply from the battery 16 continuously. Therefore, the communication terminal 15 can acquire position information and the like via the GPS antenna 15A. In addition, the communication terminal 15 can transmit information related to the vehicle body (for example, the daily operation report of the machine, position information, and etc.) stored in the memory 15C to the server using the communication antenna 15B.

Figure 5:
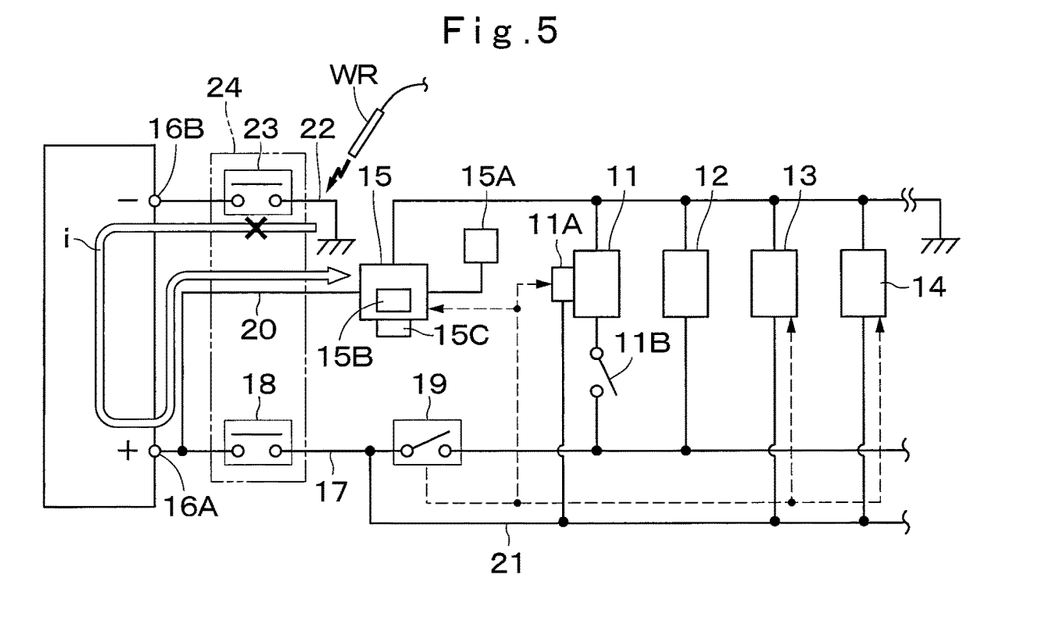
FIG. 5 is an electric circuit diagram similar to FIG. 2 showing a case where both the plus-side isolating switch and the minus-side isolating switch are in an isolated state.

Next, when performing electrical maintenance or repair work, or when using a welding machine for vehicle body modification, the service staff switches the composite switch 24 to the third switching position P3. Thereby, as shown in FIG. 5, both the plus-side isolating switch 18 and the minus-side isolating switch 23 are disconnected. When the switches 18, 23 are disconnected, all the electrical equipment 11, 12, the control devices 13, 14, and the communication terminal 15 are totally cut off from the battery 16 and power supply from the battery 16 is cut off. Therefore, the service staff can be protected from electric shock. Further, for example, even when performing welding work on the revolving frame 6 or the like serving as ground, current i from a welding rod WR can be cut off by the minus-side isolating switch 23 or the like. Therefore, the current i from the welding rod WR does not flow into the electrical equipment 11, 12, the control devices 13, 14, or the communication terminal 15 via the battery 16. As a result, it is possible to prevent damage to the electrical equipment 11, 12, the control devices 13, 14, and the communication terminal 15.

Thus, the hydraulic excavator 1 according to the present embodiment includes: the plus-side main connection line 17 for connecting the electrical equipment 11, 12 and the plus terminal 16A of the battery 16; the plus-side isolating switch 18 provided on the plus-side main connection line 17 for connecting or disconnecting the electrical equipment 11, 12 to or from the plus terminal 16A of the battery 16; the key switch 19 positioned at the downstream side of the plus-side isolating switch 18 and is connected in series to the plus-side isolating switch 18 for connecting or disconnecting the electrical equipment 11, 12 to or from the plus terminal 16 of the battery 16; the plus-side auxiliary connection line 20 positioned at an upstream side of the plus-side isolating switch 18 for connecting the communication terminal 15 and the plus terminal 16A of the battery 16; the minus-side main connection line 22 for connecting the minus terminal 16B of the battery 16 and the ground; and the minus-side isolating switch 23 provided on the minus-side main connection line 22 for connecting or disconnecting the minus terminal 16B of the battery 16 to or from the ground.

Here, the plus-side isolating switch 18 and the minus-side isolating switch 23 can be disconnected or connected individually. Therefore, when operating the hydraulic excavator 1, the operator connects both the plus-side isolating switch 18 and the minus-side isolating switch 23. Thus, by connecting the key switch 19, the electrical equipment 11, 12 can be supplied with electric power from the battery 16 to drive the electrical equipment 11, 12. On the other hand, by disconnecting the key switch 19, the electrical equipment 11, 12 can be stopped.

Further, when normal vehicle body operation is completed, the operator can disconnect the plus-side isolating switch 18 while the minus-side isolating switch 23 is in the connected state. Thus, the electrical equipment 11, 12 can be stopped while the power supply from the battery 16 to the communication terminal 15 is maintained. As a result, since the communication terminal 15 retains its transmission function, information regarding the hydraulic excavator 1 such as the daily operation report or the position information of the machine can be transmitted to the server. On the other hand, since power supply to the electrical equipment 11, 12 is stopped, dark current can be reduced, and discharge of the battery 16 can be minimized.

Further, when performing electrical maintenance or repair work, or when using the welding machine for main body modification, the service staff disconnects both the plus-side isolating switch 18 and the minus-side isolating switch 23. Accordingly, this configuration not only protects the service staff from electric shock, but also prevents the electrical equipment 11, 12 and the like installed in the vehicle body from being damaged due to the wraparound of the welding current from the welding machine or the like.

Further, the plus-side isolating switch 18 and the minus-side isolating switch 23 are provided in the composite switch 24. The composite switch 24 includes: a first switching position P1 where both the plus-side isolating switch 18 and the minus-side isolating switch 23 are in the connected state; a second switching position P2 where the minus-side isolating switch 23 is in the connected state and the plus-side isolating switch 18 is in the isolated state; and a third switching position P3 where both the plus-side isolating switch 18 and the minus-side isolating switch 23 are in the isolated state.

Therefore, by switching the composite switch 24, the plus-side isolating switch 18 and the minus-side isolating switch 23 can be switched simultaneously. Here, if the minus-side isolating switch 23 and the plus-side isolating switch 18 are provided separately, since these are to be switched individually, then the plus-side isolating switch 18 may be mistakenly disconnected with the intention of disconnecting the minus-side isolating switch 23, for example. On the contrary, since the minus-side isolating switch 23 and the plus-side isolating switch 18 are simultaneously switched by using the composite switch 24, erroneous disconnection or erroneous connection of the switches 18, 23 can be suppressed.

Further, the first electrical equipment 11 has a memory 11A where the memory 11A is connected to the plus-side branch line 21 branched from the plus-side main connection line 17 at a position between the plus-side isolating switch 18 and the key switch 19. Therefore, even when the key switch 19 is disconnected, power can be supplied from the battery 16 to the memory 11A, and various information and the like stored in the memory 11A can be retained.

Further, the plus-side branch line 21 is connected to the control devices 13, 14 installed in the construction machine. Therefore, even when the key switch 19 is disconnected, the control devices 13, 14 can be operated. Thus, when the operation of the hydraulic excavator 1 is stopped by turning off the key switch 19, the control devices 13, 14 can back up data. Further, since the plus-side branch line 21 is connected to the downstream side of the plus-side isolating switch 18, by disconnecting the plus-side isolating switch 18, in addition to the electrical equipment 11, 12, dark current flowing through the memory 11A and the control devices 13, 14 can also be suppressed.

Further, the communication terminal 15 includes the GPS antenna 15A for acquiring position information from the satellite and the communication antenna 15B for communicating with the server. Therefore, even when the plus-side isolating switch 18 or the key switch 19 is disconnected, the communication terminal 15 can acquire position information using the GPS antenna 15A and can transmit vehicle body information to the server using the communication antenna 15B. In addition to the above, the communication terminal 15 can also receive commands and the like from the server using the communication antenna 15B.

In the above-described embodiment, the plus-side isolating switch 18 and the minus-side isolating switch 23 are provided integrally with the composite switch 24. The present invention is not limited thereto, and for example, the plus-side isolating switch 18 and the minus-side isolating switch 23 may be provided separately and independently. In such a case, the plus-side isolating switch 18 and the minus-side isolating switch 23 can be switched individually.

In the above-described embodiment, a crawler type hydraulic excavator 1 has been exemplified as a construction machine. The present invention is not limited thereto, and may be applied to any construction machine having an electrical equipment, a communication terminal and a battery, and is applicable to various types of construction machines such as a wheel type hydraulic excavator or a wheel loader.

DESCRIPTION OF REFERENCE NUMERALS

1: Hydraulic excavator (Construction machine)
2: Lower traveling structure
4: Upper revolving structure
11: First electrical equipment
12: Second electrical equipment
13: First control device
14: Second control device
15: Communication terminal
15A: GPS antenna
15B: Communication antenna
16: Battery
16A Plus terminal
16B: Minus terminal
17: Plus-side main connection line
18: Plus-side isolating switch
19: Key switch
20: Plus-side auxiliary connection line
21: Plus-side branch line
22: Minus-side main connection line
23: Minus-side isolating switch
24: Composite switch

The invention claimed is:

1. A construction machine comprising:
an electrical equipment installed in a vehicle body;
a communication terminal for transmitting information of the vehicle body to a server; and
a battery for supplying power to the electrical equipment and the communication terminal, characterized in that:
the construction machine further comprises:
a plus-side main connection line for connecting the electrical equipment and a plus terminal of the battery;
a plus-side isolating switch provided on the plus-side main connection line for connecting or disconnecting the electrical equipment to or from the plus terminal of the battery;
a key switch positioned at a downstream side of the plus-side isolating switch and is connected in series to the plus-side isolating switch for connecting or disconnecting the electrical equipment to or from the plus terminal of the battery;
a plus-side auxiliary connection line positioned at an upstream side of the plus-side isolating switch for connecting the communication terminal and the plus terminal of the battery;
a minus-side main connection line for connecting a minus terminal of the battery to ground; and
a minus-side isolating switch provided on the minus-side main connection line for connecting or disconnecting the minus terminal of the battery to or from the ground.

2. The construction machine according to claim 1, wherein the plus-side isolating switch and the minus-side isolating switch are provided in a composite switch, the composite switch is configured to include:
a first switching position where both the plus-side isolating switch and the minus-side isolating switch are in a connected state;
a second switching position where the minus-side isolating switch is in the connected state while the plus-side isolating switch is in an isolated state; and
a third switching position where both the plus-side isolating switch and the minus-side isolating switch are in the isolated state.

3. The construction machine according to claim 1, wherein the electrical equipment includes a memory, and the memory is connected to a plus-side branch line branched from the plus-side main connection line at a position between the plus-side isolating switch and the key switch.

4. The construction machine according to claim 3, wherein the plus-side branch line is connected to a control device installed in the vehicle body.

5. The construction machine according to claim 1, wherein the communication terminal includes a GPS antenna that acquires position information from a satellite and a communication antenna that communicates with the server.

* * * * *